(12) United States Patent
Nomura et al.

(10) Patent No.: US 6,357,506 B1
(45) Date of Patent: Mar. 19, 2002

(54) JOINING APPARATUS OF THERMOPLASTIC PIPES

(75) Inventors: Hirokazu Nomura; Kiyoteru Hirabayashi; Wenjie Mao, all of Kanagawa (JP)

(73) Assignee: Nippon Nokan Koji Kabushiki Kaisha, Kanagawa (JP)

( * ) Notice: Subject to any disclaimer, the term of this patent is extended or adjusted under 35 U.S.C. 154(b) by 0 days.

(21) Appl. No.: 09/480,728

(22) Filed: Jan. 7, 2000

Related U.S. Application Data (62) Division of application No. 09/059,312, filed on Apr. 13, 1998, now Pat. No. 6,029,727.

(51) Int. Cl.⁷ .............................................. B29C 65/06
(52) U.S. Cl. ................... 156/580; 156/580.1; 156/73.5; 228/2.1
(58) Field of Search ............................. 156/73.5, 304.2, 156/304.6, 556, 580, 580.1, 499, 580.2; 228/112.1, 2.1

(56) References Cited

U.S. PATENT DOCUMENTS

| | | | | |
|---|---|---|---|---|
| 3,002,871 A | * | 10/1961 | Tramm et al. | 156/73.5 |
| 3,777,967 A | * | 12/1973 | Searle et al. | 228/2.1 |
| 5,277,744 A | * | 1/1994 | Snyder | 156/580 |
| 5,697,545 A | * | 12/1997 | Jennings et al. | 228/112.1 |

* cited by examiner

*Primary Examiner*—Michael A. Tolin
(74) *Attorney, Agent, or Firm*—Ladas & Parry (57) ABSTRACT

An orbital vibration generator means comprising, in addition to a clamp 4, 5 for holding a pair of thermo plastic pipes coaxially and a pressurizing means 2, 3, 14 for bringing into contact under a pressure junction end faces of a pair of thermo plastic pipes 10, 11 held by these clamps, a crank shaft 8 having a shaft portion 8a and a crank portion 8b in which the axes of these shaft portion 8a and crank portion 8b are eccentric, a motor 6 for giving rotation to the crank shaft 8, a bearing 9 attached to the crank portion 8b of said crank shaft 8, and a orbital vibration clamp 13 holding pipe an end portion of a thermo plastic pipe, formed integrally with the outer ring of the bearing 9 to move integrally with said bearing.

3 Claims, 8 Drawing Sheets

JOINING APPARATUS OF THERMOPLASTIC PIPES

This is a divisional of application Ser. No. 09/059,312 filed Apr. 13, 1998 now U.S. Pat. No. 6,029,727.

BACKGROUND OF THE INVENTION

The present invention relates to a jointing apparatus for jointing thermo plastic pipes by using frictional heat caused by vibration.

Recently, polyethylene pipe, which is a thermo plastic pipe, is coming to be used commonly for gas piping or water piping. Because, the polyethylene pipe is excellent not only in corrosion resistance, but also in earthquake resistance due to its large extensibility. In such a situation, a method for jointing thermo plastic pipes more effectively and securely and an apparatus for this method are demanded increasingly.

As a conventional method for jointing polyethylene pipes, a butt welding method using a flat-plate-shaped hot plate, a socket welding method using a socket, or the like is used. The butt welding method consists in heating respective extremities of pipes to be jointed by means of a hot plate heated to a high temperature having a larger cross-section than the pipe diameter, thereafter removing the hot plate, butting end faces of the pipes to be jointed and welding under pressure. As representative methods of the socket welding method, there are a method for welding similarly to said butt fusion method using a hot plate having a shape that corresponds with a shape of a used socket and a method for welding by using a socket having an implanted electric heating element wire such as Nichrome wire and supplying this electric heating element wire with electricity to heat the external surface of the pipe and the internal surface of the socket and thereby weld them.

Besides, jointing methods for butting and jointing plastic pipes, by using frictional heat generated on butting junction faces of plastic pipes by turning the pipes in reverse directions to each other, in place of using a hot plate or an electric heating element as mentioned above, are disclosed in Japanese Patent Publications No. Hei 2-13619, No. Shou 63-39415 and others. The art disclosed in the Japanese Patent Publication No. Hei 2-13619 is to obtain a connecting joint without requiring burring, by using friction caused by rotation. In Japanese Patent Publication No. Shou 63-39415, a terminal portion of a socket is pressed to the front end of a plastic pipe to obtain friction caused by rotation so that the shape of the terminal portion of the socket may be independent of the diameter of the plastic pipe and easier molding of the socket can be expected.

On the other hand, Japanese Patent Laid-Open No. Shou 62-35830 proposes a method for manufacturing a support with a cap. This method is to weld the outer circumference of a support body and a cap only at required points without using a specific heating device, by introducing an extremity of the support body into a cavity of the cap made of synthetic resin mold, and turning the outer circumference of the support body relatively to the cap. Japanese Patent Laid-Open No. Shou 62-248236 describes a jointing method of thermo plastic pipes of different diameter by frictional heat. Besides, Japanese Patent Laid-Open No. Hei 02-248236 (Japanese Patent Publication No. Hei 5-36225) also proposes a jointing method using frictional heat between plastic materials.

Moreover, the Inventors have already proposed a basic method for jointing plastic pipes by applying rectilinear vibration to generate frictional heat and applied for a patent by filing Japanese Patent Applications No. Hei 7-196625, No. Hei 7-240522 and No. Hei 8-68989.

In a butt welding method or a socket welding method using a hot plate mentioned above, as a hot plate is used repeatedly, soil deposited on the hot plate sticks to the pipe end face so that junction surfaces come to include impurities resulting in junction defects.

Moreover, with the electric heating of a hot plate, it takes long time about 700 sec from the beginning of electric supply to the plate to the completion of welding, resulting in low labor effectiveness. When a socket having an electric heat element wire such as Nichrome wire implanted therein is used, it is necessary to provide a socket including a heat element wire every time a couple of pipes are to be jointed and a great number of sockets should be prepared provoking some questions from economical point of view. Further, since it takes about 1700 sec from the beginning of electric supply to the completion of welding, a labor effectiveness problem is caused especially when a number of pipes are to be jointed.

In the case of the butt jointing of pipes by using heat generated by rotational friction as described, for example, in Japanese Patent Publication No. Hei 02-13619, a large amount of energy is necessary for rotating the entire pipes to be jointed.

What is described in Japanese Patent Laid-Open No. Shou 62-35830 is not for a butt jointing of both polyethylene pipes but of entirely different pipes; so it is difficult to apply this method to butt jointing of both polyethylene pipes. Because, in the method described in said document, the junction strength is ensured by inserting a mandrel into a cavity in a way to increase contact area in order to enlarge the junction surface, while such enlarged junction surface is not allowed in butt jointing.

On the other hand, when polyethylene pipes of an identical diameter are to be jointed, the contact area is small so that the method described in Japanese Patent Laid-Open No. Shou 62-248623 can not ensure a sufficient reliability, because of low mechanical strength per unit area obtained by the method. As a result, in practice, the jointing strength is increased by increasing the contact area through the use of pipes having different diameters.

The invention of Japanese Patent Laid-Open No. Hei 02-248236 (Japanese Patent Publication No. Hei 5-36225) is an example of friction jointing of solid rods using mechanical rotation; however it is also difficult to ensure junction strength for the jointing of pipes (hollow cylinder), having small junction cross section, causing a reliability problem.

On the other hand, vibration jointing methods and apparatus of Japanese Patent Applications No. Hei 7-196625, No. Hei 7-240522 and No. Hei 8-68989 already filed by the Inventors are to verify a laboratory level principle and are not practical enough to be applied on jobsites. Besides, a method for generating frictional heat by orbital movement of pipe end faces, by using electromagnets (or permanent magnets), is proposed in Japanese Patent Application No. Hei 7-196625, but the adoption of electromagnets complicated the apparatus itself excessively.

In other words, conventional apparatus have not be well devised from structural point of view, as a vibration jointing apparatus appropriated to be used in the practical field, such as a piping jobsite for gas, water or the like.

SUMMARY OF THE INVENTION

The present invention intends to solve these inconveniences and has the object of obtaining a jointing apparatus of thermo plastic pipes, which can be practically used on jobsites or the like, and form a good junction easily in a short period of time. The following apparatus is proposed to solve the problems mentioned above.

According to the first embodiment, a jointing apparatus comprises a clamp means for holding a pair of thermo plastic pipes coaxially, a pressurizing means for bringing into contact under a pressure end faces to be jointed of said pair of thermo plastic pipes held by said clamp means and an orbital vibration generator means attached adjacent to one or both pipe end portion(s) of said pair of thermo plastic pipes for affording orbital vibration to said pipe end portion.

Said orbital vibration generator means comprises a crank shaft having a shaft portion and a crank portion whose axes are eccentric, a motor for giving rotation to the shaft portion of said crank shaft, a bearing attached to the crank portion of said crank shaft and an orbital vibration clamp for holding said pipe end portion, formed integrally with the outer ring of said bearing to move integrally with said bearing.

Moreover, said orbital vibration clamp is supported at least with three points.

According to the jointing apparatus of the first embodiment, its size or weight can be appropriated for the jobsite use in piping work for gas, water or the like and its labor effectiveness can be improved remarkably.

Besides, frictional heat generated by orbital vibration allows a sure junction within a very short period of time of 1 min or less.

In the second embodiment, a jointing apparatus comprises a clamp means for holding a pair of thermo plastic pipes coaxially, a pressurizing means for bringing into contact under a pressure end faces to be jointed of said pair of thermo plastic pipes held by said clamp means and a rectilinear vibration generator means attached adjacent to one or both pipe end portion(s) of said pair of thermo plastic pipes for affording rectilinear vibration to said pipe end portion.

Moreover, said rectilinear vibration generation means comprises an actuator for performing rectilinear reciprocating movement by receiving output from a hydraulic servo-valve and a rectilinear vibration clamp for holding said pipe end portion, linked to said actuator.

Besides, the vibration frequency of said actuator is 100 to 150 Hz.

According to the jointing apparatus of the second embodiment, similarly to the apparatus of the first embodiment, its size or weight can be appropriated for the jobsite use in piping work for gas, water or the like and its labor effectiveness can be improved remarkably.

Besides, frictional heat generated by rectilinear vibration allows a sure junction within a very short period of time of 1 min or less.

Any of the first and the second embodiments prevents contamination defects which are encountered in hot plate method, a conventional jointing method, in a way to ensuring a high reliability of the junction.

Moreover, as it is unnecessary to prepare a number of sockets in which heat elements are buried as in conventional socket fusion jointing method, an excellent effect from economical point of view is achieved.

DETAILED DESCRIPTION OF THE PREFERRED EMBODIMENTS

Now the preferred embodiments according to the present invention will be described referring to the attached drawings.

First Embodiment

It concerns an orbital vibration type jointing apparatus wherein an orbital vibration is applied to a junction surface of a thermo plastic pipe.

Figure 1:
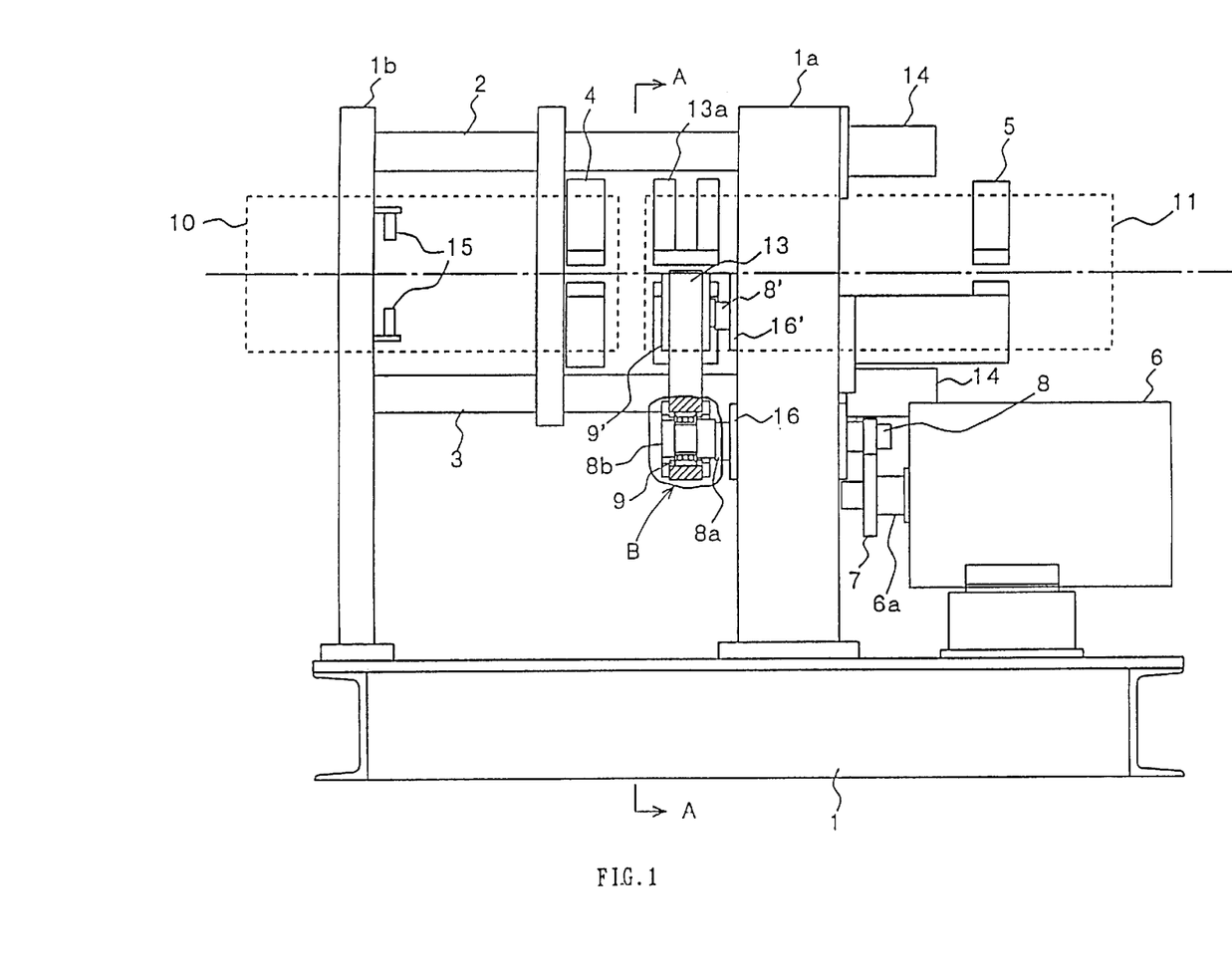
FIG. 1 is a side view showing a jointing apparatus according to a first embodiment.
Figure 2:
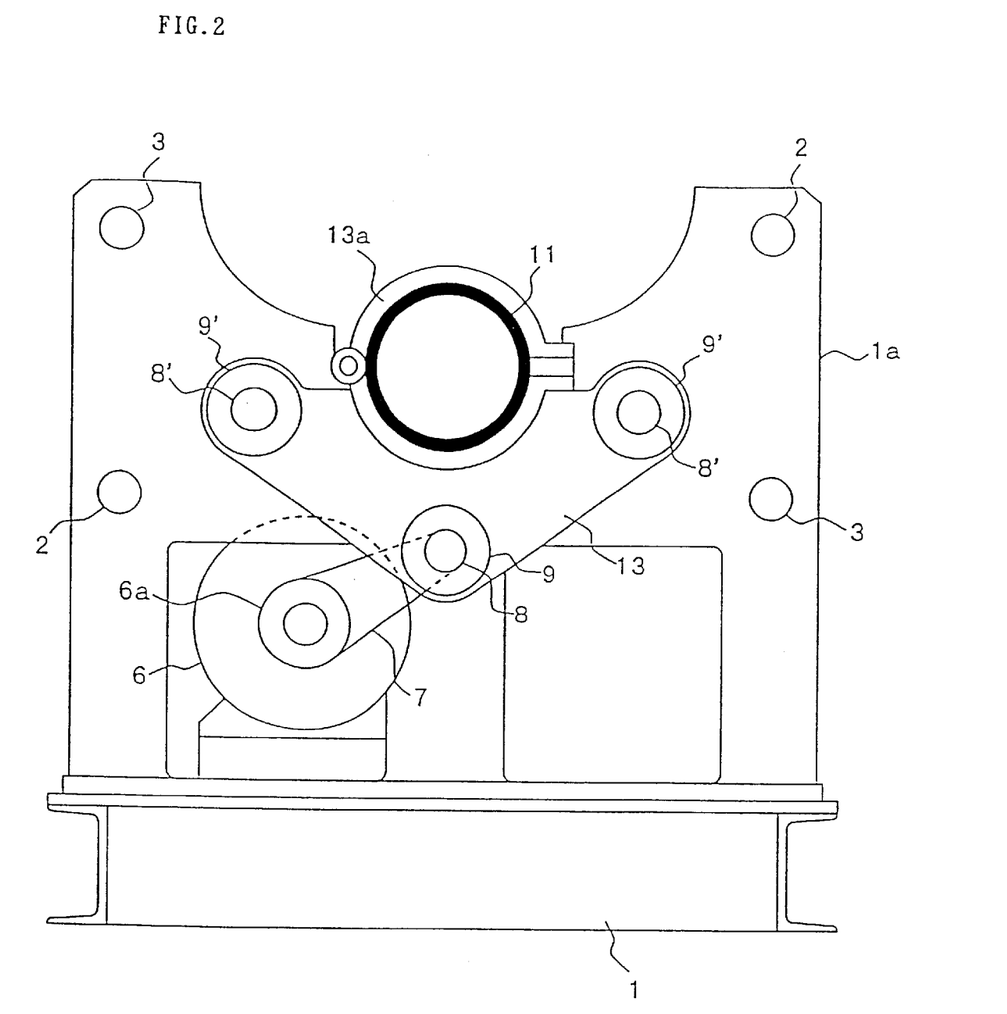
FIG. 2 is a view along A—A of FIG. 1.
Figure 3:
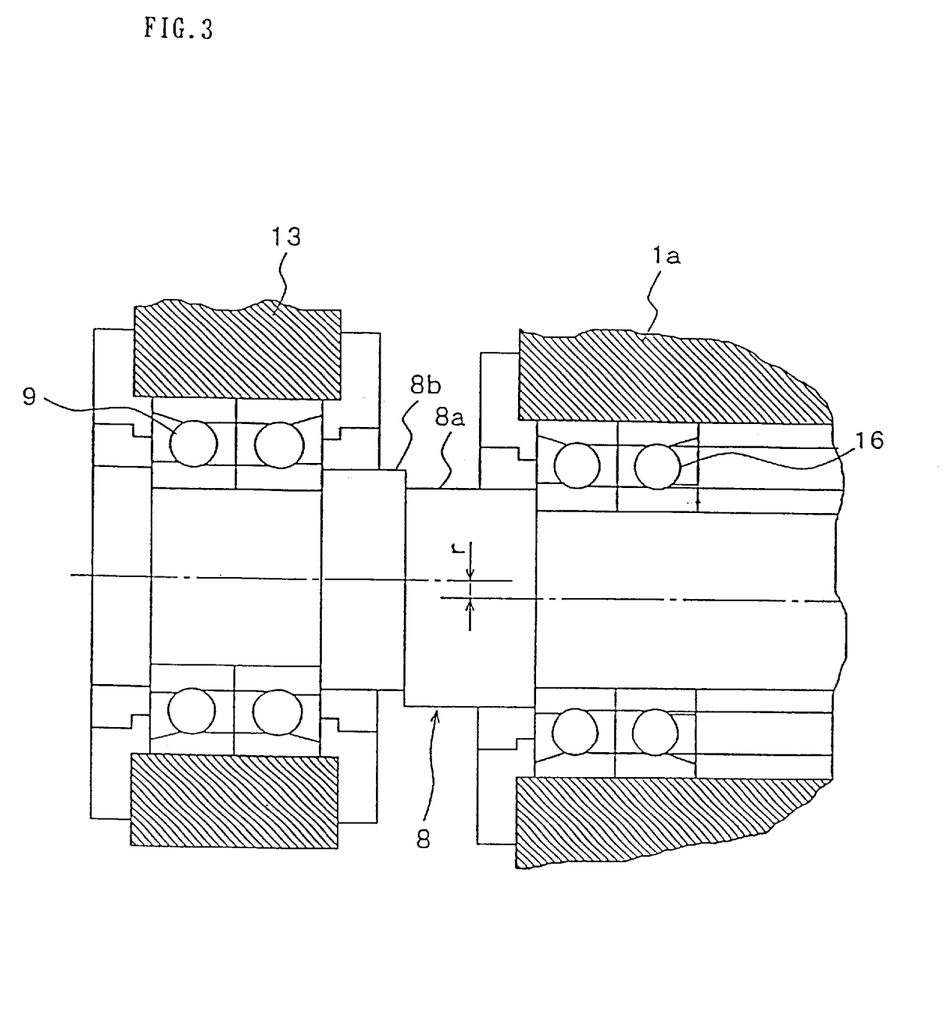
FIG. 3 is an enlarged view of a portion B of FIG. 1.

FIG. 1 is a side view showing a jointing apparatus according to a first embodiment, FIG. 2 is a view along A—A of FIG. 1, and FIG. 3 is an enlarged view of a portion B of FIG. 1. In these drawings, references 10 and 11 indicate a pair of thermo plastic pipes to be jointed, where 10 is a moving side thermo plastic pipe and 11 a fixed side thermo plastic pipe.

A pair of upset driving shafts 2 and a pair of moving clamp guide shafts 3 are laid across between a first support 1a and a second support 1b fixed to a base 1 and, at the same time, a moving side clamp 4 for holding and fixing the moving side thermo plastic pipe 10 is attached to the upset driving shaft 2 and the moving clamp guide shaft 3. A fixed side clamp 5 for holding and fixing the fixed side thermo plastic pipe 11 is attached to the first support 1a. Further, a vibration driving motor 6 is attached to the base 1 and the output of this motor 6 is transmitted to a crank shaft 8 via a belt 7 from a motor shaft 6a. Besides, 14 indicates an AC servo-motor or a hydraulic cylinder for moving the upset driving shaft 2, 15 a moving guide for supporting the movement of the moving side thermo plastic pipe 11, 16 and 16' bearings rotatably supporting crank shafts 8 and 8' respectively at the support 1a. Here, the bearings 16 and 16' of the same type and also the crank shafts 8 and 8' of the same type are used.

As shown in FIG. 3, the crank shaft 8 is composed of a shaft portion 8a and a crank portion 8b where the axes of the shaft portion 8a and the crank portion 8b are eccentric by a distance r (deviation amount r). A bearing 9 for transmitting the rotation of the shaft center of the crank portion 8b is attached around the outer circumference of the crank 8b and an orbital vibration clamp 13 is formed integrally with the bearing 9 around the outer ring of this bearing 9. As shown in FIG. 2, the orbital vibration clamp 13 includes a damper 13a for holding the end portion of the fixed side thermo plastic pipe 11. Besides, two other crank shafts 8' supported rotatably and a bearings 9' (of same type as the bearing 9) are arranged so as to form a equilateral triangle or an isosceles triangle to the crank shaft 8 and the bearing 9, for supporting the orbital vibration clamp 13 at three points. It may also be supported at three or more points.

Next, the process to joint thermo plastic pipes using this apparatus will be described. Here, jointing is performed using 200U polyethylene pipe described in JIS K6774 as thermo plastic pipe.

First, the moving side thermo plastic pipe 10 is mounted on the moving side clamp 4 and the fixed side thermo plastic pipe 11 is mounted on the fixed sided clamp 5. The protruded length (protruded length of the junction end face from the orbital vibration clamp 13 or the moving side clamp 4) of the moving side and fixed side thermo plastic pipes 10, 11 are adjusted, then the respective clamps 4, 5, 13 and the moving guide 15 are tighten to fix the pipes 10, 11.

Further, the upset driving shaft 2 is turned and displaced by means of the AC servo-motor or the hydraulic cylinder 14 to advance the moving side thermo plastic pipe 10 and the moving side clamp 4, then the moving side thermo plastic pipe 10 is pressed to the fixed side thermo plastic pipe 11 with a given upset force. The upset force can be controlled by the flowing current value for the AC motor 14 or by the servo-valve for the hydraulic cylinder.

Figure 4:
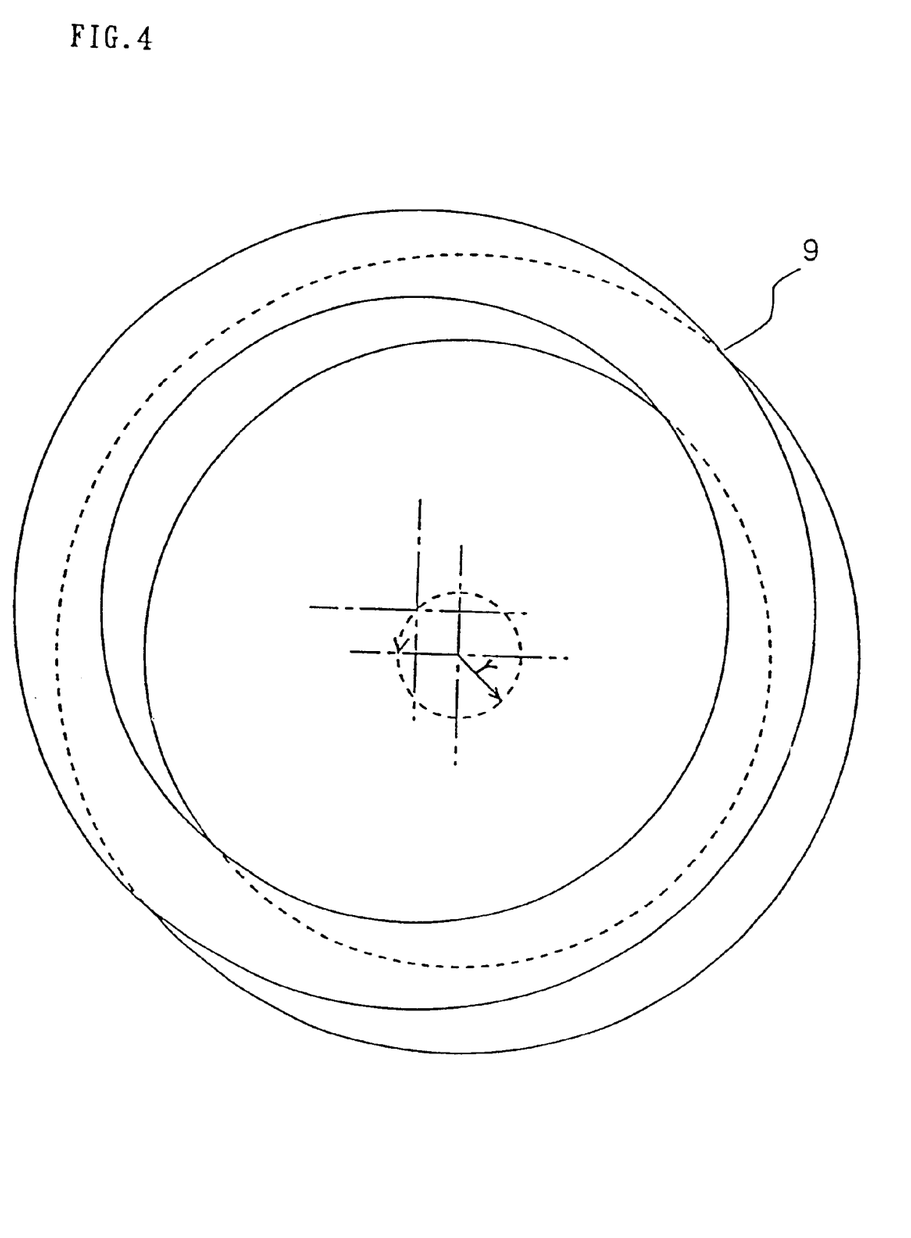
FIG. 4 illustrates orbital vibration of a thermo plastic pipe.

Next, the vibration driving motor 6 is activated to orbitally vibrate the orbital vibration clamp 13 with a given frequency. Namely, the rotation of the motor shaft 6a is transmitted to the crank shaft 8 via the belt 7. Here, deviation vibration generated by the eccentricity of the axial center of the shaft portion 8a and crank portion 8b of the crank shaft 8 is translated into the orbital vibration by the orbital vibration clamp 13 as shown in FIG. 4. This is because, the bearing 9 separates the rotation of the crank shaft 8 itself and the rotation due to the eccentricity of the crank shaft 8 and only the orbital vibration of the crank shaft 8 is transmitted to the orbital vibration clamp 13 via the outer ring of the bearing 9. The orbital vibration clamp 13 shall not rotate in respect of the shaft center of the crank shaft 8, because it is supported at three points by the crank shaft 8 and the two other crank shafts 8', 8'.

When the end face of the fixed side thermo plastic pipe 11 vibrates orbitally in respect of the end face of the moving side thermo plastic pipe 10 by means of the orbital vibration clamp 13, frictional heat is generated at the junction end faces of the thermo plastic pipes to fuse them. Fused plastic is discharged from the junction end face toward the circumference as burr. When the upset amount, namely fusion amount, attains a given value, the vibration is automatically stopped by servo-control. Then, after a given cooling time, say after about 10 sec, respective clamps are opened and the thermo plastic pipe are taken out to complete the jointing of a pair of thermo plastic pipes.

As a result, when polyethylene pipes are jointed as mentioned above, the jointing performance of the polyethylene pipes is excellent enough. In this case, the specifications of the rotating portion for jointing are as follows. These specifications represent only an example.

Orbital rotation speed at vibration clamp portion: 7200 r.p.m. (120 cps)
Deviation amount: 0.75 mm
Weight of driving portion: about 30 Kg
Max. acceleration: about 44G
Vibration driving motor
Capacity: 5.5 KW×2p
Speed: 3600 r.p.m. (increased by two times through timing belt)
Driving: Inverter power supply By the way, respective clamps for fixing the thermo plastic pipe can be changed appropriately according to the pipe diameter to be jointed.

As the deviation amount r should be adjusted according to the pipe diameter to be jointed, crank shafts having different deviation amount r are selected and used conveniently according to the pipe diameter to be jointed.

Second embodiment

It concerns a rectilinear vibration type jointing apparatus for rectilinearly vibrating the junction face of a thermo plastic pipe using a hydraulic servo mechanism. It is characterized in that the apparatus body is reduced in size and weight by reducing the exciting force through the reduction of vibration frequency, as the vibration inertia is proportional to the square of vibration frequency. This allows reduction of the body weight to the order of about 800 kg.

Figure 5:
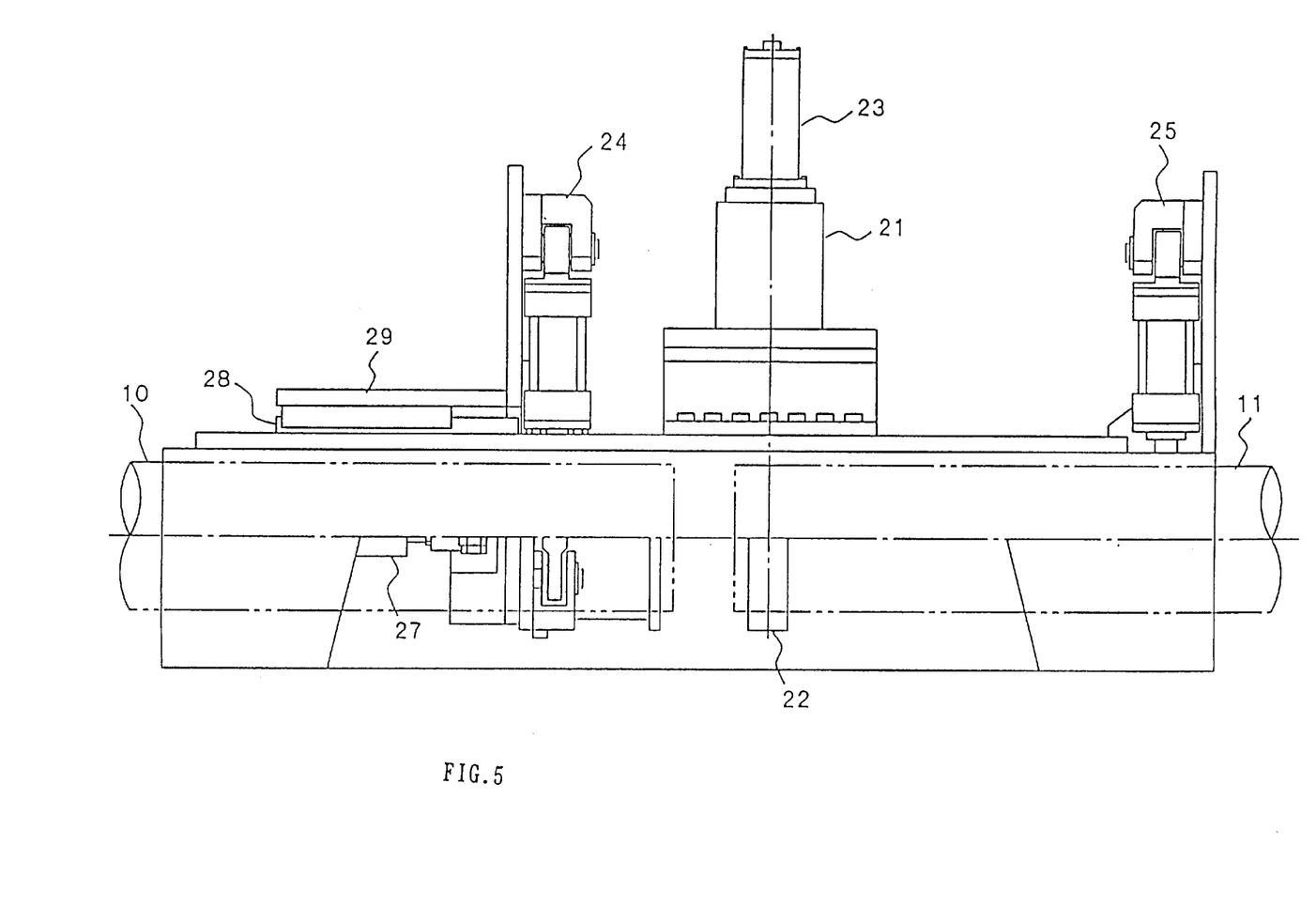
FIG. 5 is a top view showing a jointing apparatus according to a second embodiment.
Figure 6:
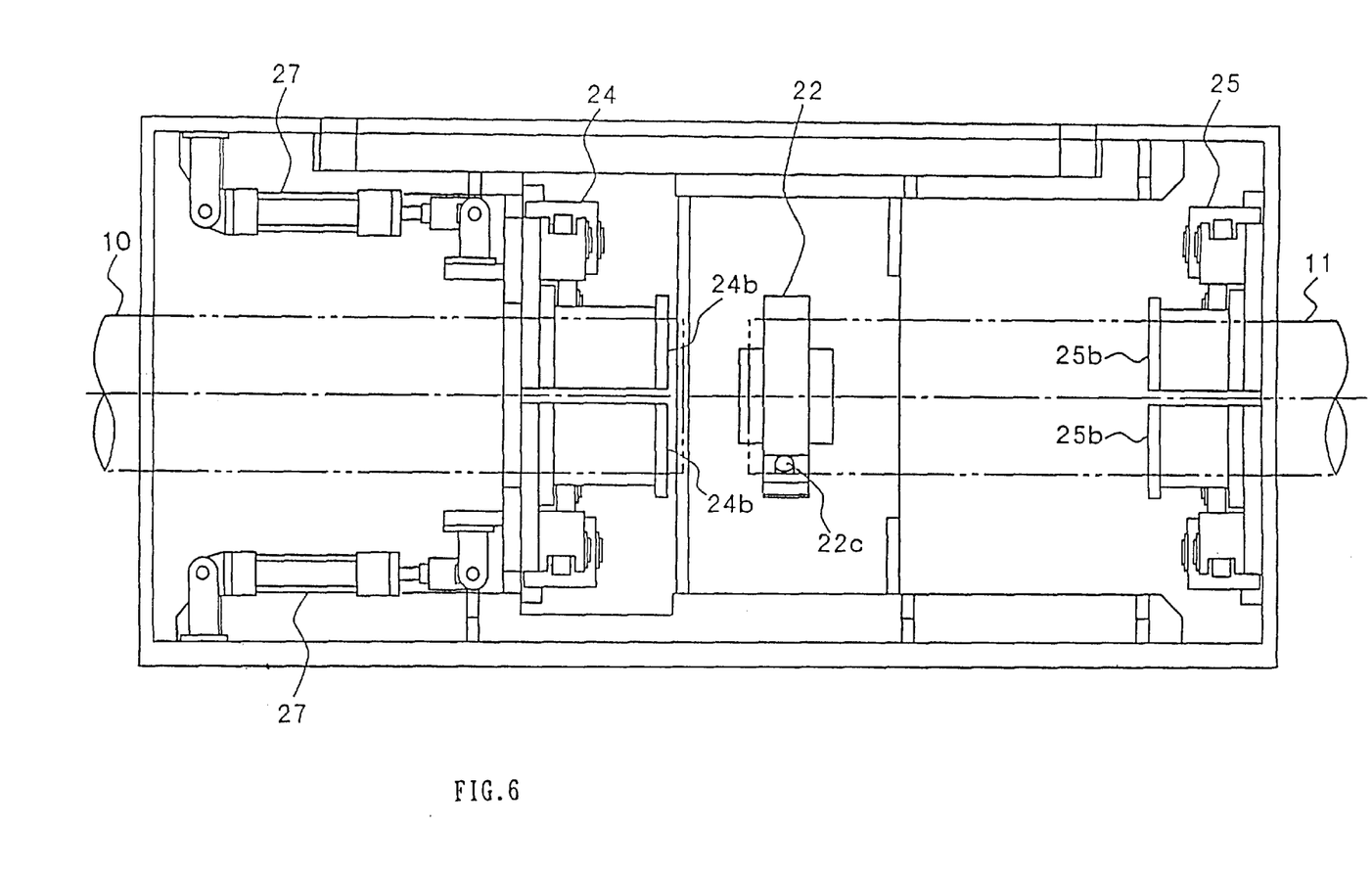
FIG. 6 is a side view of the jointing apparatus according to the second embodiment.

FIG. 5 is a top view and FIG. 6 is a side view of the jointing apparatus according to the second embodiment 2. In these drawings, references 10 and 11 indicate a pair of thermo plastic pipes to be jointed, where 10 is a moving side thermo plastic pipe and 11 a fixed side thermo plastic pipe. 21 is a hydraulic actuator vibrating at the frequency of 100 Hz to 150 Hz, 22 is a rectilinear vibration clamp linked to the hydraulic actuator 21 to hold and vibrate the junction end portion of the fixed side thermo plastic pipe 11 and 23 is a hydraulic servo-valve for driving the hydraulic actuator 21. 24 is a moving side clamp for fixing the moving side thermo plastic pipe 10 and 25 is a fixed side clamp for fixing fixed side thermo plastic pipe 11. 27 is a hydraulic upset cylinder to bring the junction end face of the moving side thermo plastic pipe 10 into contact under a pressure with the junction end face of the fixed side thermo plastic pipe 11, and 28 is a linear guide for displacing a bed 29 by means of the upset cylinder 27.

Figure 7:
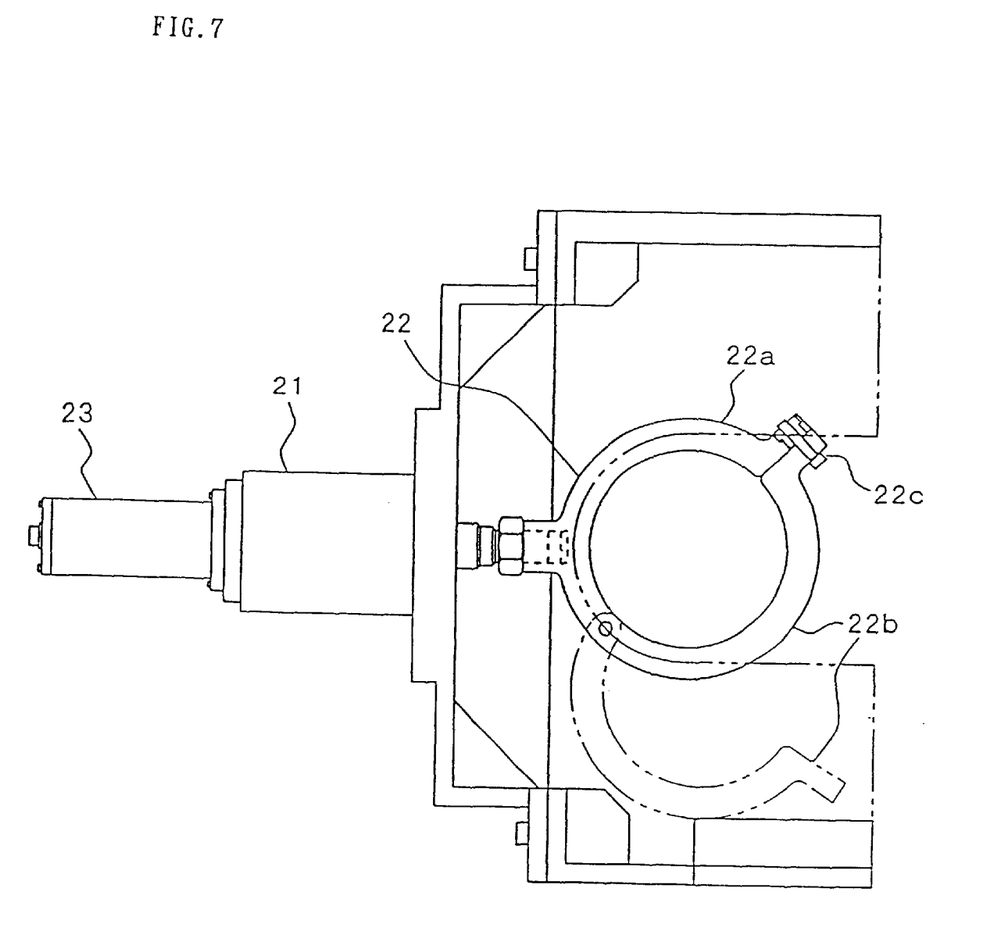
FIG. 7 shows a rectilinear vibration clamp of the jointing apparatus according to the second embodiment.

FIG. 7 shows a rectilinear vibration clamp connected to the hydraulic servo mechanism. The rectilinear vibration clamp 22 is linked to the hydraulic actuator 21 driven by the hydraulic servo-valve 23. This ring-shaped rectilinear vibration clamp 22 is composed of two parts 22a, 22b and one of two parts is releasably attached to the other by means of a bolt 22c or the like, and thereby the thermo plastic pipe can be held conveniently. More, this rectilinear vibration clamp 22 can be changed and used appropriately according to the pipe diameter to be jointed.

Figure 8:
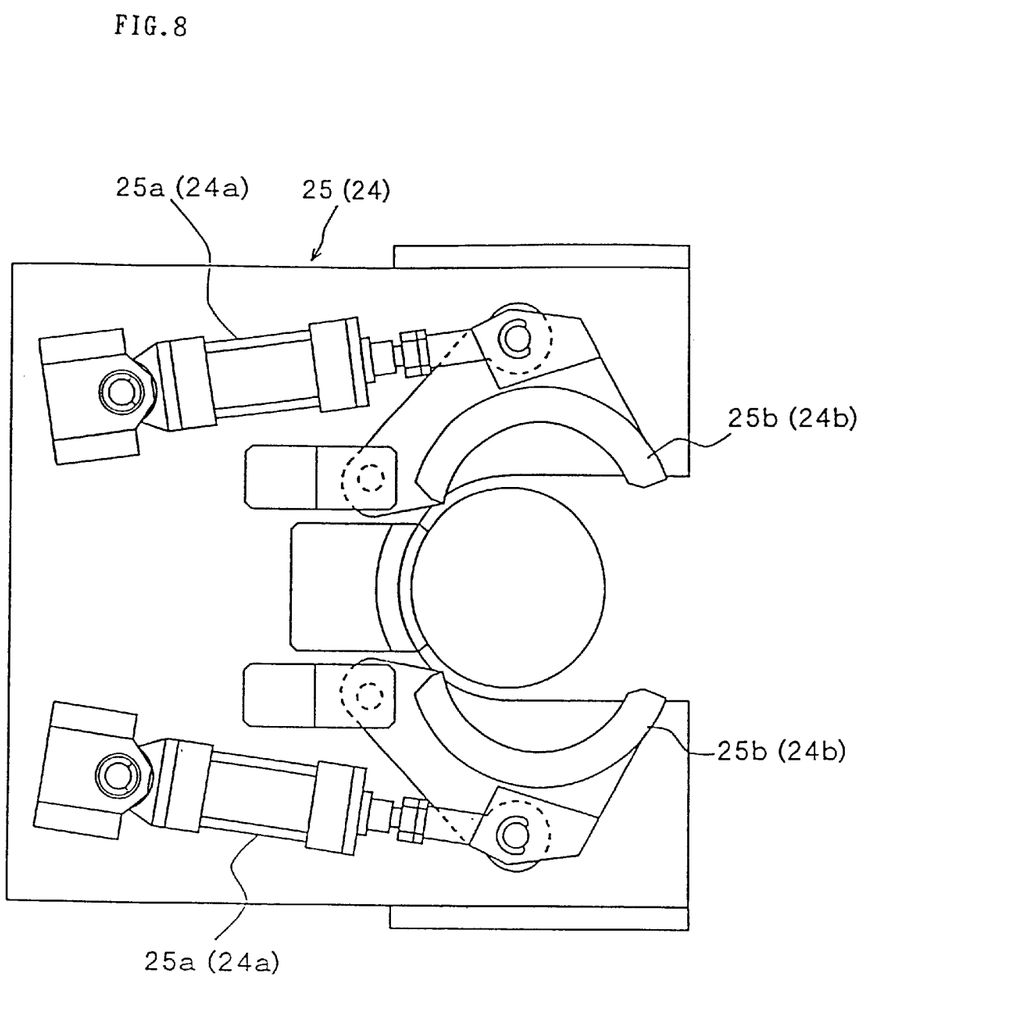
FIG. 8 shows a fixed side clamp of the jointing apparatus according to the second embodiment.

FIG. 8 shows a fixed side clamp 25. Basically, the fixed side clamp 25 is composed of a hydraulic cylinder 25a and a damper 25b opened and closed by the same, to open/close the damper 25b by extending/retracting the arm of the hydraulic cylinder 25a in order to hold and fix the pipe. This damper 25b is also exchanged appropriately according to the pipe diameter to be joined. Such structure is same for the moving side clamp 24 having a hydraulic cylinder 24 and a damper 24b.

Here, it is further devised as follows to improve the labor effectiveness.

(1) The body structure is made capable of generating the vibration laterally so that plastic pipes can be introduced into/extracted from the respective clamps laterally. This allows extracting the plastic pipe easily from the body in case of trouble, for instance.

(2) The cramping by the dampers 24b, 25b can be set in three states (on, off, slight cramping) by the hydraulic valve; and also, the protruded length (protruded length of the junction end face from the moving side clamp 24 or the rectilinear vibration clamp 22) of thermo plastic pipes can be set easily by using the inching of the upset operation.

Next, the process to joint thermo plastic pipes using this apparatus will be described. Here, the jointing is performed using 200U polyethylene pipe described in JIS K6774 as thermo plastic pipe.

First, the moving side thermo plastic pipe 10 is mounted on the moving side clamp 24 laterally along the axial direction, and the fixed side thermo plastic pipe 11 is mounted laterally on the fixed side clamp 25 along the axial direction. The protruded length of the moving side and fixed side thermo plastic pipes 10, 11 is adjusted, then tighten the respective clamps 22, 24, 25 to fix the pipes 10, 11.

Then, the moving side thermo plastic pipe 10 is brought into contact with the fixed side thermo plastic pipe 11 and pressed thereto with a given upset force by using the upset cylinder 27. At the same time, rectilinearly the rectilinear vibration clamp 22 is rectilinearly vibrated via the hydraulic actuator 21 by using the hydraulic servo-valve 23. The hydraulic servo-valve 23 vibrates rectilinearly the junction end face of the fixed side thermo plastic pipe 11 through the hydraulic actuator 21 and the rectilinear vibration clamp 22. Thus, frictional heat is generated at the junction end faces of the thermo plastic pipes to fuse them. Fused plastic is discharged from the junction end face toward the circumference as burr. When the upset amount, namely fusion amount, attains a given value, the servo-control stops the vibration automatically. Then, after a given cooling time, say after about 10 sec, respective clamps are opened and the thermo plastic pipe is taken out to complete the jointing of a pair of thermo plastic pipes.

When polyethylene pipes are joined as mentioned above, the joint performance of the polyethylene pipes is excellent enough. In this case, the vibration conditions of the apparatus are as following. These conditions represent only an example.

Amplitude: 0 to 2 mm peak to peak

Wave form: Sinusoidal

Power level: Capable of continuous operation at 120 Hz×2 mmP-P

Vibration frequency: 100 to 150 Hz

The apparatuses described above in the first and the second embodiments are also applicable to all other thermo plastic pipes such as polyethylene pipe, polybudene pipe.

We claim:

1. An apparatus for joining end faces of a pair of the thermoplastic pipes, end faces located on end portions of the thermoplastic pipes, comprising:

a clamp means for holding the pair of thermoplastic pipes coaxially, a pressurizing means for bringing into contact under pressure the end faces to be joined of the pair of thermoplastic pipes held by said clamp means, and an orbital vibration generator means supported adjacent to one pipe end portion or both pipe end portions of said pair of thermoplastic pipes for providing orbital vibration, wherein said orbital vibration generator means includes a crank shaft having a shaft portion and a crank portion, wherein the shaft portion and the crank portion have eccentric axes, a motor for rotating the shaft portion of said crank shaft, a bearing attached to the crank portion of said crank shaft, and an orbital vibration clamp for holding a pipe end portion fixed to said bearing to move integrally with said bearing.

2. An apparatus for joining thermoplastic pipes according to claim 1, wherein said bearing has an inner ring and an outer ring, said crank portion of the crank shaft is fixed to the inner ring and said orbital vibration clamp is fixed to the outer ring.

3. An apparatus for joining thermoplastic pipes according to claim 2, wherein said orbital vibration clamp is supported at least by three points.

* * * * *